United States Patent
Noh et al.

(10) Patent No.: US 11,454,785 B2
(45) Date of Patent: Sep. 27, 2022

(54) SMALL LENS SYSTEM INCLUDING EIGHT LENSES OF −+−+−++− REFRACTIVE POWERS

(71) Applicant: SEKONIX CO., LTD., Gyeonggi-do (KR)

(72) Inventors: Ki Youn Noh, Gyeonggi-do (KR); Soon Cheol Choi, Gyeonggi-do (KR); Seong Jun Bae, Gyeonggi-do (KR); Su Jeong Kim, Gyeonggi-do (KR)

(73) Assignee: SEKONIX CO., LTD.

( * ) Notice: Subject to any disclaimer, the term of this patent is extended or adjusted under 35 U.S.C. 154(b) by 501 days.

(21) Appl. No.: 16/728,473

(22) Filed: Dec. 27, 2019

(65) Prior Publication Data

US 2021/0124150 A1    Apr. 29, 2021

(30) Foreign Application Priority Data

Oct. 28, 2019    (KR) ................. 10-2019-0134256

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0121098 A1*    4/2019    Zhou .................. G02B 13/0045

\* cited by examiner

*Primary Examiner* — Wen Huang
(74) *Attorney, Agent, or Firm* — Mendelsohn Dunleavy, P.C.

(57) ABSTRACT

Disclosed is a small lens system including a first lens, a second lens, a third lens, a fourth lens, a fifth lens, a sixth lens, a seventh lens, and an eighth lens, wherein the first lens has a lens surface convex toward an object, the second lens has a lens surface convex toward the object, the third lens has a lens surface convex toward the object, the fourth lens has a positive refractive power, the fifth lens has a negative refractive power, the sixth lens has a lens surface convex toward an image, the seventh lens has a positive refractive power and is configured such that a lens surface is convex toward the object in the vicinity of an optical axis, and the eighth lens has a negative refractive power and is configured such that an object-side surface and an image-side surface are concave in the vicinity of the optical axis.

25 Claims, 5 Drawing Sheets

PRIOR ART

SMALL LENS SYSTEM INCLUDING EIGHT LENSES OF −+−+−++− REFRACTIVE POWERS

BACKGROUND OF THE INVENTION

Field of the Invention

The present invention relates to a wide-angle lens system including a total of eight lenses, and more particularly to a small wide-angle lens system configured such that the lens system is small and lightweight by appropriately designing the refractive powers, shapes, etc. of the lenses and such that high-resolution images can be provided by correcting distortion, whereby it is possible to obtain wide-angle images.

Description of the Related Art

Recent mobile terminals are equipped with a camera, with which it is possible to perform video communication and to take photographs. In addition, as the number of functions of the camera in the mobile terminal gradually increases, demand for high resolution and wide angle of a camera for mobile terminals has gradually increased, and there is a trend toward miniaturization of the camera such that the mobile terminal can be easily and conveniently carried.

In recent years, a lens of the camera has been made of a plastic material, which is lighter than glass, in order to realize high quality, high performance, and miniaturization of the camera, and a lens system has been configured using eight or more lenses in order to realize high resolution.

Particular, for a small lens mounted in a smartphone, it is advantageous to reduce the length of the lens system (total track length) as much as possible due to limitation in the thickness of the smartphone.

FIG. 1 shows a lens system disclosed in U.S. Pat. No. 10,036,876. In the lens system shown in FIG. 1, each of a second lens and a sixth lens is a lens having a positive refractive index. However, the ratio TTL/ImagH of the distance TTL between the front surface of a lens and an image surface to the height ImagH of the image surface, which is related to the length of the lens, is 1.69. Consequently, the length of the lens is long (i.e. the smaller the TTL/ImagH value, the shorter the length of the lens), whereby the lens system is limited in application to a thin smartphone.

In the case in which TTL is shortened in order to reduce the TTL/ImagH value, however, the tolerance of the lens system becomes sensitive, whereby there is high possibility of occurrence of design errors.

SUMMARY OF THE INVENTION

The present invention has been made in view of the above problems, and it is an object of the present invention to provide a small wide-angle lens system configured such that the lens system is small and lightweight by appropriately designing the refractive powers, shapes, etc. of the lenses and such that high-resolution images can be provided by correcting distortion.

In accordance with an aspect of the present invention, the above and other objects can be accomplished by the provision of a small lens system including a first lens, a second lens, a third lens, a fourth lens, a fifth lens, a sixth lens, a seventh lens, and an eighth lens sequentially arranged from an object, wherein the first lens is a meniscus lens having a lens surface convex toward the object, the second lens is a meniscus lens configured such that a lens surface having a positive refractive power is convex toward the object, the third lens is a meniscus lens configured such that a lens surface having a negative refractive power is convex toward the object, the fourth lens is a lens having a positive refractive power, the fifth lens is a lens having a negative refractive power, the sixth lens is a meniscus lens having a lens surface convex toward an image, the seventh lens is a meniscus lens having a positive refractive power and configured such that a lens surface of the seventh lens is convex toward the object in the vicinity of an optical axis, and the eighth lens is a lens having a negative refractive power and configured such that both an object-side surface and an image-side surface of the eighth lens are concave in the vicinity of the optical axis, and wherein all surfaces of the first to eighth lenses are aspherical surfaces, each of the seventh lens and the eighth lens has at least one inflection point, and the absolute value of the refractive power (P1) of the first lens satisfies |P1|<0.01.

In accordance with another aspect of the present invention, there is provided a small lens system including a first lens, a second lens, a third lens, a fourth lens, a fifth lens, a sixth lens, a seventh lens, and an eighth lens sequentially arranged from an object, wherein the first lens is a meniscus lens having a lens surface convex toward the object, the second lens is a meniscus lens configured such that a lens surface having a positive refractive power is convex toward the object, the third lens is a meniscus lens configured such that a lens surface having a negative refractive power is convex toward the object, the fourth lens is a lens having a positive refractive power, the fifth lens is a lens having a negative refractive power, the sixth lens is a meniscus lens having a lens surface convex toward an image, the seventh lens is a meniscus lens having a positive refractive power and configured such that a lens surface of the seventh lens is convex toward the object in the vicinity of an optical axis, and the eighth lens is a lens having a negative refractive power and configured such that both an object-side surface and an image-side surface of the eighth lens are concave in the vicinity of the optical axis, and wherein all surfaces of the first to eighth lenses are aspherical surfaces, each of the seventh lens and the eighth lens has at least one inflection point, the absolute value of the refractive power (P1) of the first lens satisfies |P1|<0.01, and an angle of incidence (AO') that an ordinary ray of a field forms with a normal line at a point of the image-side surface of the eighth lens through which the ordinary ray passes satisfies AOI<12°.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a wide-angle lens system including a total of eight lenses, and more particularly to a lens system configured such that a first lens, a second lens, a third lens, a fourth lens, a fifth lens, a sixth lens, a seventh lens, and an eighth lens are sequentially arranged from an object along an optical axis.

In addition, the present invention relates to a small wide-angle lens system configured such that the lens system is small and lightweight by appropriately designing the refractive powers, shapes, etc. of the lenses and such that the lens system has a field of view greater than 75 degrees by correcting distortion.

In particular, the present invention provides a small wide-angle lens system having a reduced refractive power, whereby the tolerance of the lens system is alleviated even though TTL is short, wherein an angle of incidence AOI that an ordinary ray of a field forms with a normal line at a point of the image-side surface of the eighth lens through which the ordinary ray passes is formed so as to be less than 12° such that the shape of the outside corner of the eighth lens is inclined toward the object, which is advantageous to a small lens system.

In addition, the ratio of the distance between the object-side surface of the first lens and an image surface to the height of the image surface is less than 1.5, whereby it is possible to provide a lens system having a short length, which is easily applicable to a thin or small camera module, particularly a smartphone.

Figure 1:
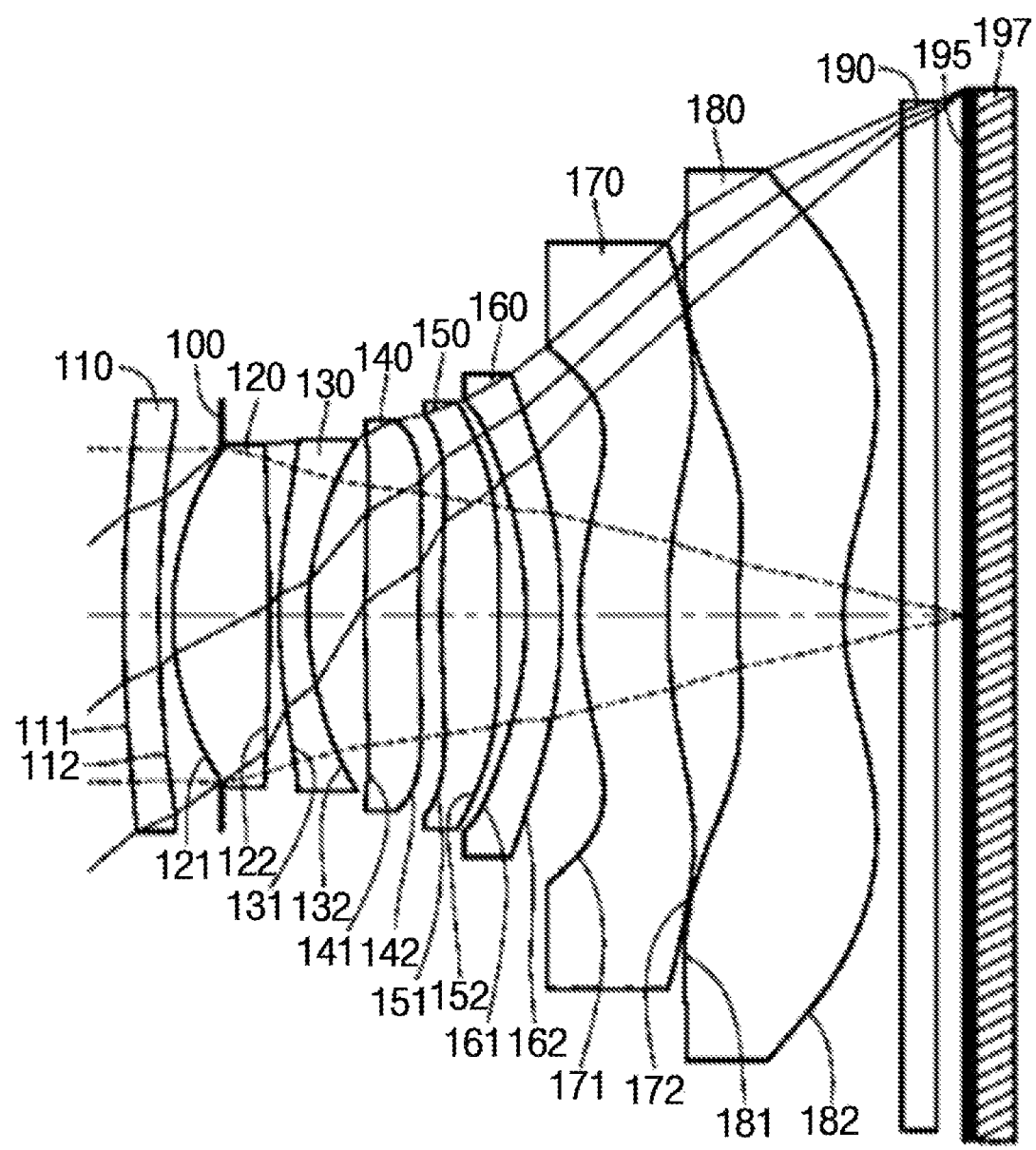
FIG. 1 is a schematic view showing a conventional small wide-angle lens system.
Figure 2:
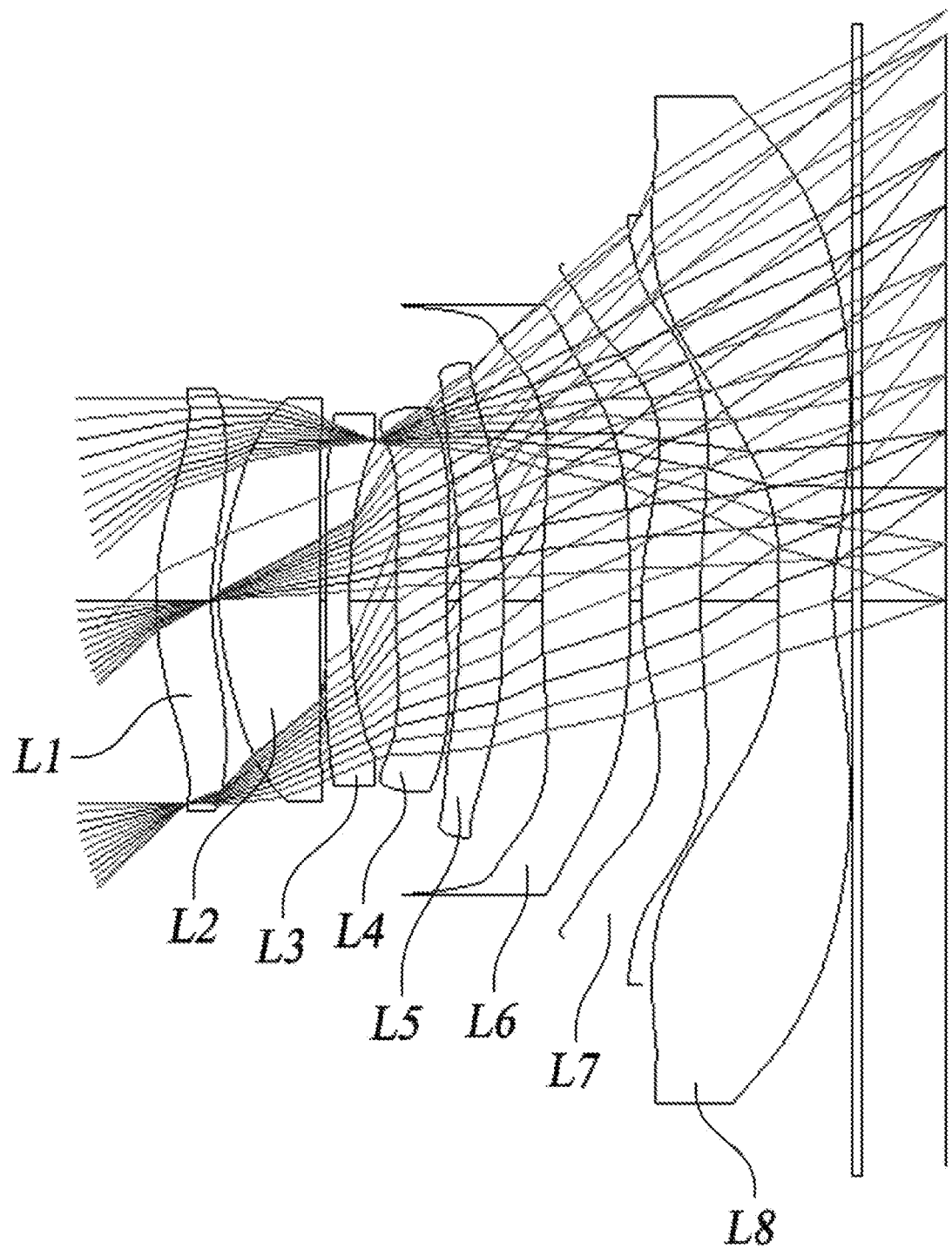
FIG. 2 is a view showing a first embodiment of a small wide-angle lens system according to the present invention.
Figure 3:
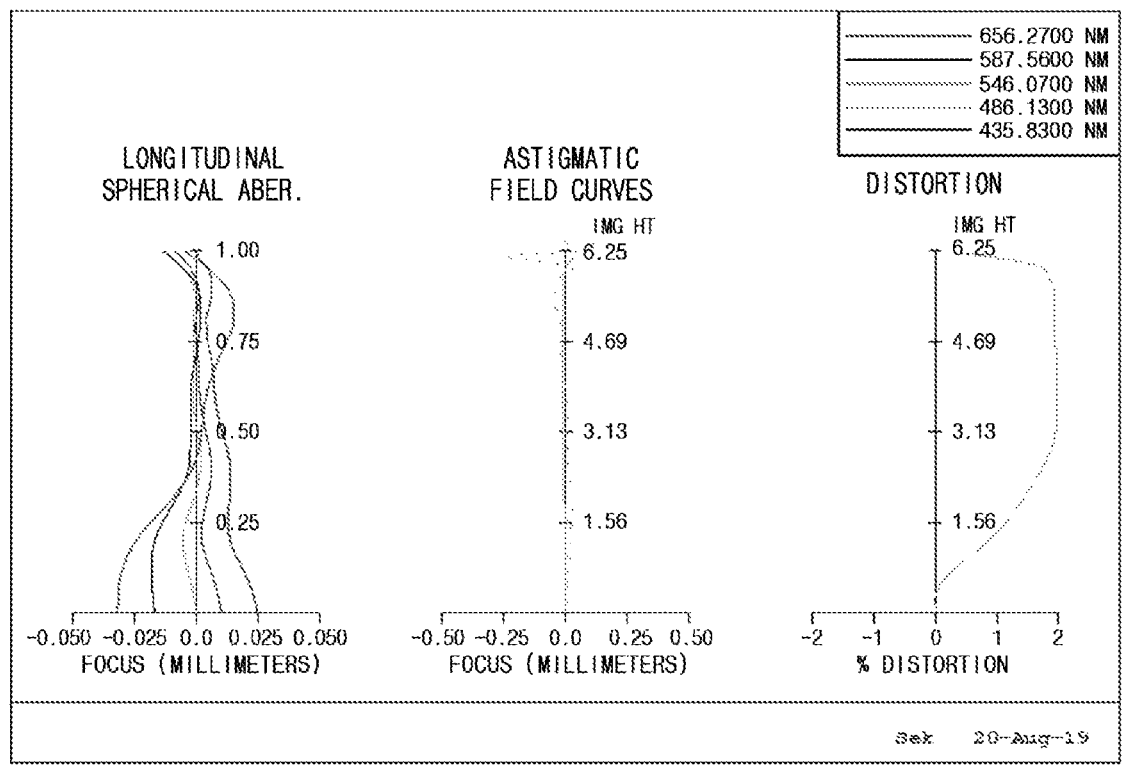
FIG. 3 is a view showing aberration according to a first embodiment of the present invention.
Figure 4:
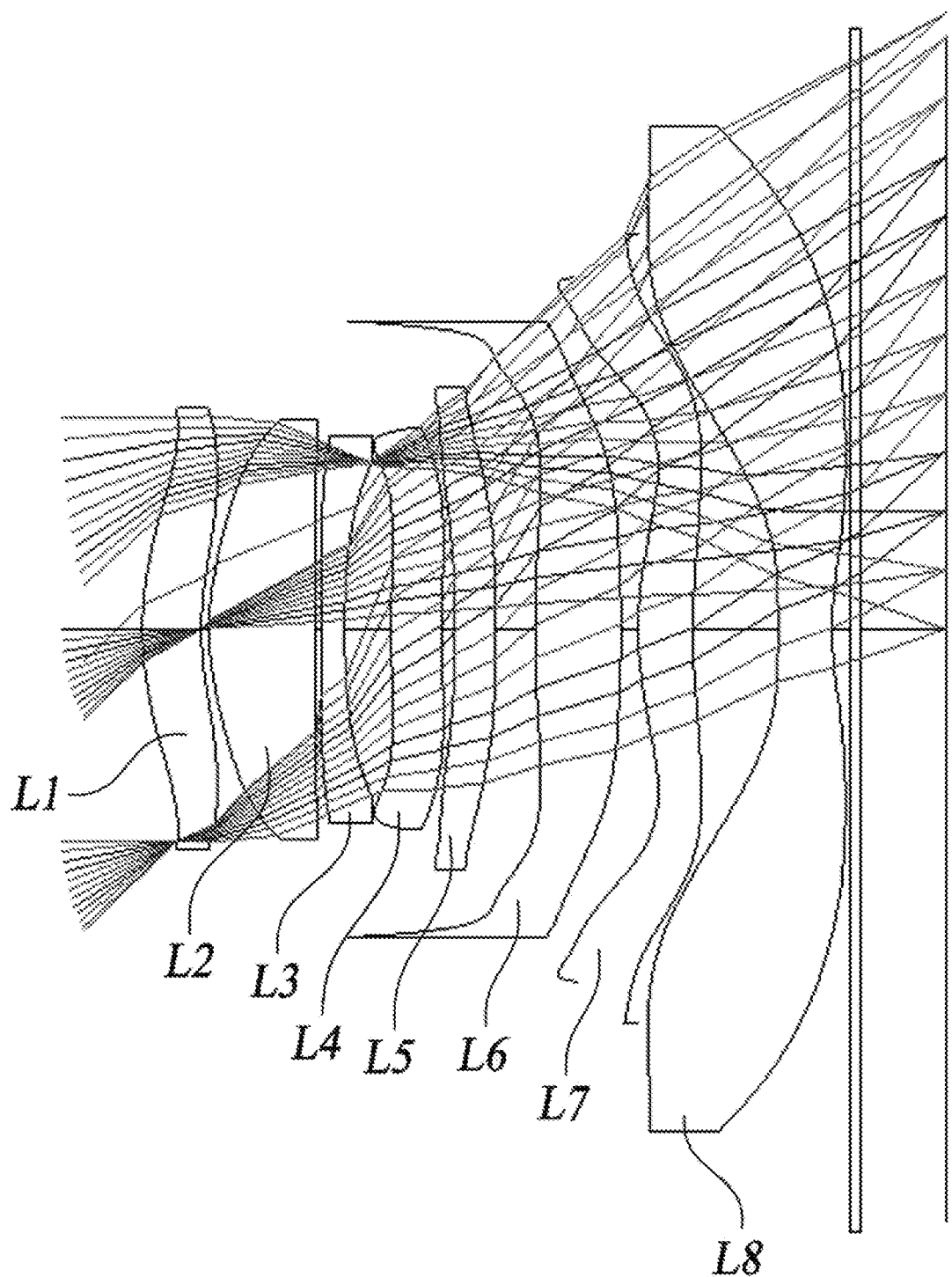
FIG. 4 is a view showing a second embodiment of the small wide-angle lens system according to the present invention.
Figure 5:
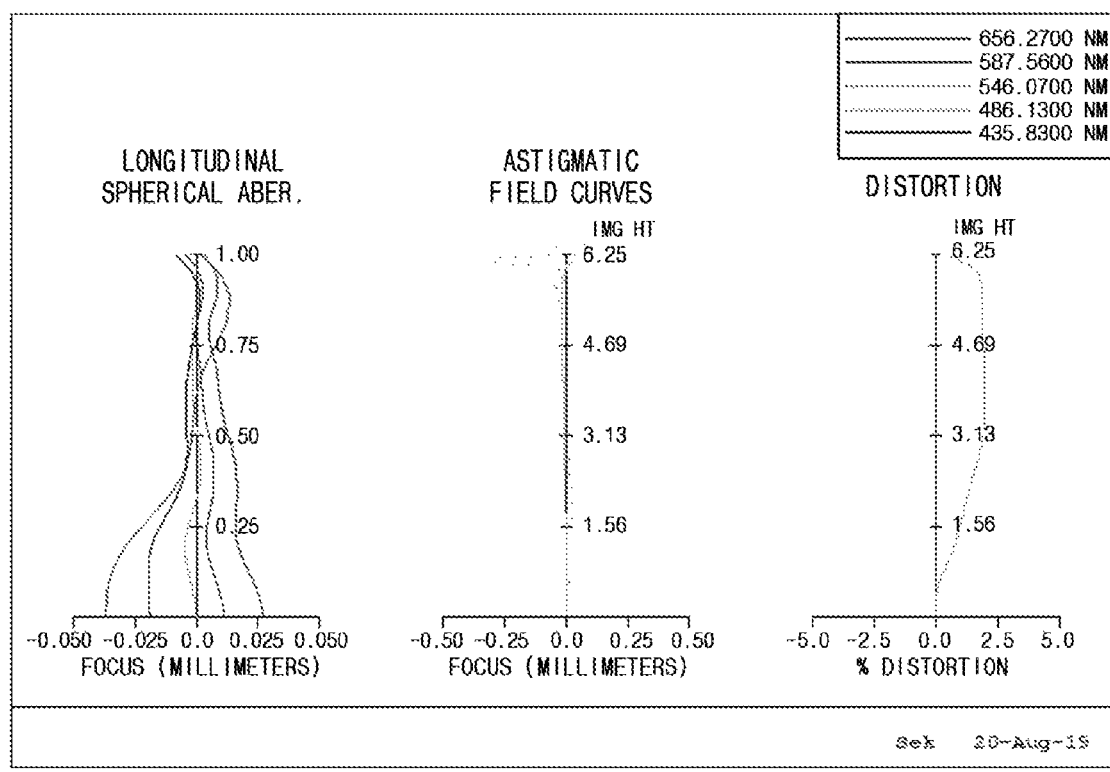
FIG. 5 is a view showing aberration according to a second embodiment of the present invention.

Hereinafter, the present invention will be described in detail with reference to the accompanying drawings. FIG. 2 is a view showing a first embodiment of a small wide-angle lens system according to the present invention, FIG. 3 is a view showing aberration according to a first embodiment of the present invention, FIG. 4 is a view showing a second embodiment of the small wide-angle lens system according to the present invention, and FIG. 5 is a view showing aberration according to a second embodiment of the present invention.

As shown, the present invention provides a small lens system configured such that a first lens L1, a second lens L2, a third lens L3, a fourth lens L4, a fifth lens L5, a sixth lens L6, a seventh lens L7, and an eighth lens L8 are sequentially arranged from an object along an optical axis, wherein the first lens L1 is a meniscus lens having a lens surface convex toward the object, the second lens L2 is a meniscus lens configured such that a lens surface having a positive refractive power is convex toward the object, the third lens L3 is a meniscus lens configured such that a lens surface having a negative refractive power is convex toward the object, the fourth lens L4 is a lens having a positive refractive power, the fifth lens L5 is a lens having a negative refractive power, the sixth lens L6 is a meniscus lens having a lens surface convex toward an image, the seventh lens L7 is a meniscus lens having a positive refractive power and configured such that a lens surface of the seventh lens L7 is convex toward the object in the vicinity of an optical axis, and the eighth lens L8 is a lens having a negative refractive power and configured such that both the object-side surface and the image-side surface of the eighth lens L8 are concave in the vicinity of the optical axis, and wherein all surfaces of the first to eighth lenses L1 to L8 are aspherical surfaces, each of the seventh lens L7 and the eighth lens L8 has at least one inflection point, and the absolute value of the refractive power P1 of the first lens L1 satisfies |P1|<0.01.

Consequently, the positive and negative refractive powers of the respective lenses constituting the lens system are uniformly distributed, whereby it is possible to realize high performance suitable for a high-resolution small lens system.

In particular, the first lens L1 is a meniscus lens having a lens surface convex toward the object, wherein the absolute value of the refractive power P1 of the first lens L1 satisfies |P1|<0.01.

That is, the first lens L1 is formed as a meniscus lens having a convex surface facing the object, whereby it is advantageous in securing a space for the first lens L1 in a barrel, the center thickness of the first lens L1 is appropriately larger than the effective-diameter outermost thickness of the first lens L1, and the refractive power of the first lens L1 is formed so as to approximate to 0. Consequently, it is possible to miniaturize the first lens L1. In addition, the refractive power of the first lens L1 is very small while the curvature of the first lens L1 is relatively high, whereby the tolerance of the first lens L1 is alleviated even though TTL of the first lens L1 is very short, and therefore a possibility of reproducing the performance of the first lens L1 is increased.

In addition, the first lens L1 has at least one inflection point, and the second lens L2 is a meniscus lens having a positive refractive power and configured such that a lens surface of the second lens L2 is convex toward the object. The second lens L2 is formed so as to be very close to the first lens L1, whereby it is advantageous in realizing a small lens system.

The third lens L3 is a meniscus lens configured such that a lens surface having a negative refractive power is convex toward the object, the fourth lens L4 is a lens having a positive refractive power, the fifth lens L5 is a lens having a negative refractive power, the sixth lens L6 is a meniscus lens having a lens surface convex toward the image, the seventh lens L7 is a meniscus lens having a positive refractive power and configured such that a lens surface of the seventh lens L7 is convex toward the object in the vicinity of the optical axis, and the eighth lens L8 is a lens having a negative refractive power and configured such that both the object-side surface and the image-side surface of the eighth lens L8 are concave in the vicinity of the optical axis, wherein all surfaces of the first to eighth lenses L1 to L8 are aspherical surfaces, and each of the seventh lens L7 and the eighth lens L8 has at least one inflection point, whereby a small lens system is realized.

In addition, the ratio of the effective-diameter outermost distance et12 between the first lens L1 and the second lens L2 to the center distance c12 between the first lens L1 and the second lens L2 satisfies 6<et12/ct12<10. That is, the distance between the effective-diameter outermost portion of the first lens L1 and the effective-diameter outermost portion of the second lens L2 is increased so as to be advantageous in improving flare.

Also, in the small lens system according to the present invention, the ratio of the distance TTL between the object-side surface of the first lens L1 and an image surface to the image height ImagH satisfies 1.0<TTL/ImagH<1.5, whereby it is possible to provide a small lens system having a short length, which is suitable for application to a small electronic device, such as a smartphone having a small thickness.

Also, in the small lens system according to the present invention, the absolute value of the ratio of the focal distance f1 of the first lens L1 to the focal distance F of the entire lens system satisfies 100<|f1/F|. This prescribes the ratio of the focal distance of the first lens L1 to the composite focal distance of the entire lens system. Consequently, it is possible to correct aberration and to miniaturize the lens system. Furthermore, the focal distance of the first lens L1 is increased such that the refractive power of the first lens L1 approximates to 0, whereby the tolerance of the first lens L1 is alleviated.

Also, in the small lens system according to the present invention, the F number Fno of each lens satisfies Fno<2.0. Consequently, the effective diameter of each lens is increased in order to obtain clear images even at a place at which the intensity of radiation is low.

Also, in the small lens system according to the present invention, the focal distance f6 of the sixth lens L6, the focal distance f7 of the seventh lens L7, and the focal distance F of the entire small lens system are configured to satisfy 1.0<(F/f6)+(F/f7)<−0.5. That is, the refractive powers of the sixth lens L6 and the seventh lens L7 are adjusted to reduce the distance from the focus to the mount reference surface of an optical system (flange back length; FBL) and thus to reduce the length of the entire lens system.

In addition, the ratio of the radius of curvature R4 of the object-side surface of the second lens L2 to the center thickness ct2 of the second lens L2 satisfies 2.0<R4/ct2<3.0. That is, the radius of curvature R4 of the object-side surface of the second lens L2 is reduced, which is advantageous in designing a small lens system.

In addition, the seventh lens L7 is configured such that both the object-side surface and the image-side surface of the seventh lens L7 are concave in a peripheral portion of the lens, which is advantageous in designing a small lens system.

In addition, the ratio of the diameter EPD of an entrance pupil to the center distance ct14 from the first lens L1 to the fourth lens L4 satisfies 1.1<EPD/ct14<1.8. That is, EPD is increased in order to reduce Fno, which is advantageous in designing a small lens system.

In addition, the Abbe number V5 of the fifth lens L5, the Abbe number V6 of the sixth lens L6, the Abbe number V7 of the seventh lens L7, and the Abbe number V8 of the eighth lens L8 satisfy 40<V5<60, 40<V6<60, 40<V7<60, and 40<V8<60, respectively. That is, the Abbe numbers of the respective lenses are uniformly distributed, whereby power is divided and chromatic aberration is corrected.

Meanwhile, in the lens system according to the present invention, an angle of incidence AOI that an ordinary ray of a field forms with a normal line at a point of the image-side surface of the eighth lens L8 through which the ordinary ray passes satisfies AOI<12°. That is, the angle of incidence of the ordinary ray of the field is set to less than 12° such that the shape of the outside corner of the image-side surface of the eighth lens L8 is inclined toward the object, which is advantageous to a small lens system.

In addition, each of the first to eighth lenses L1 to L8 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having different Abbe numbers so as to be advantageous in correcting chromatic aberration.

In addition, the small lens system according to the present invention is characterized in that the field of view of the small lens system is greater than 75 degrees, and provides a wide-angle image.

As described above, the present invention relates to a lens system including a total of eight lenses, more particularly to a lens system configured such that a first lens L1, a second lens L2, a third lens L3, a fourth lens L4, a fifth lens L5, a sixth lens L6, a seventh lens L7, and an eighth lens L8 are sequentially arranged from an object along an optical axis.

In addition, the present invention provides a small wide-angle lens system configured such that the lens system is small and lightweight by appropriately designing the refractive powers, shapes, etc. of the lenses and such that the lens system has a field of view greater than 75 degrees by correcting distortion.

In particular, the present invention provides a small wide-angle lens system configured such that the overall curvature of the lens system is increased in order to reduce power, whereby the tolerance of the lens system is alleviated even though TTL is short, wherein the ratio of the distance between the object-side surface of the first lens L1 and an image surface to the height of the image surface is less than 1.5, whereby it is possible to provide a lens system having a short length, which is easily applicable to a thin or small camera module, particularly a smartphone.

Hereinafter, embodiments of the present invention will be described with reference to the accompanying drawings.

First Embodiment

FIG. 2 is a view showing a first embodiment of a small high-resolution wide-angle lens system according to the present invention.

As shown, a first lens L1, a second lens L2, a third lens L3, a fourth lens L4, a fifth lens L5, a sixth lens L6, a seventh lens L7, and an eighth lens L8 are sequentially arranged from an object on the optical axis.

Table 1 below shows numerical data of the lenses constituting the lens system according to the first embodiment of the present invention.

TABLE 1

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 3.436 | 0.586 | 1.5441 | 56.0 |
| Stop (S2) | 3.229 | 0.078 | | |
| S3 | 2.809 | 1.067 | 1.5441 | 56.0 |
| S4 | 31.183 | 0.057 | | |
| S5 | 34.782 | 0.251 | 1.6700 | 19.4 |
| S6 | 7.278 | 0.490 | | |
| S7 | 11.435 | 0.538 | 1.6150 | 25.9 |
| S8 | 16.364 | 0.136 | | |
| S9 | −10.154 | 0.452 | 1.5350 | 56.0 |
| S10 | −14.646 | 0.417 | | |
| S11 | 51.798 | 0.924 | 1.5441 | 56.0 |
| S12 | −10.103 | 0.121 | | |
| S13 | 3.607 | 0.618 | 1.5441 | 56.0 |
| S14 | 6.557 | 0.830 | | |
| S15 | −39.787 | 0.571 | 1.5350 | 56.0 |
| S16 | 3.037 | 0.193 | | |
| S17 | Infinity | 0.110 | 1.5168 | 64.2 |
| S18 | Infinity | 0.884 | | |
| Image | Infinity | 0.000 | | |

As shown in FIG. 2, the first lens L1, the second lens L2, the third lens L3, the fourth lens L4, the fifth lens L5, the sixth lens L6, the seventh lens L7, and the eighth lens L8 are sequentially arranged from the object. On the assumption that an optical-axis direction is X and a direction perpendicular to the optical axis is Y, the following aspherical equation is defined.

$$X(Y) = \frac{Y^2}{R} \frac{1}{1 + \sqrt{1 - (1+K)\left(\frac{Y}{R}\right)^2}} + A_3 Y^4 +$$

$$A_4 Y^6 + A_5 Y^8 + A_6 Y^{10} + \ldots + A_{14} Y^{26}$$

[Mathematical Expression 1]

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 2 below.

TABLE 2

|     | s1    | s2    | s3    | s4    | s5    | s6    | s7    | s8    | s9    | s10   | s11   | s12   | s13   | s14   | s15   | s16   |
|-----|-------|-------|-------|-------|-------|-------|-------|-------|-------|-------|-------|-------|-------|-------|-------|-------|
| K   | −2.77 | −1.61 | −0.39 | −0.01 | 0.03  | 13.64 | 0.00  | 0.00  | 0.00  | 0.00  | −98.94| 3.47  | 0.00  | 0.00  | 64.05 | −15.89|
| A3  | 0.00  | −0.05 | −0.03 | −0.05 | −0.06 | −0.02 | −0.02 | 0.00  | 0.03  | 0.02  | 0.04  | 0.03  | −0.03 | −0.04 | −0.09 | −0.03 |
| A4  | 0.00  | 0.00  | 0.00  | 0.09  | 0.12  | 0.04  | −0.01 | −0.03 | −0.06 | −0.05 | −0.04 | −0.02 | 0.00  | 0.01  | 0.03  | 0.01  |
| A5  | 0.00  | 0.00  | 0.00  | −0.12 | −0.14 | −0.04 | 0.01  | 0.03  | 0.06  | 0.04  | 0.02  | 0.01  | 0.00  | 0.00  | −0.01 | 0.00  |
| A6  | 0.00  | 0.00  | 0.00  | 0.10  | 0.12  | 0.02  | −0.02 | −0.02 | −0.04 | −0.02 | −0.01 | 0.00  | 0.00  | 0.00  | 0.00  | 0.00  |
| A7  | 0.00  | 0.00  | 0.00  | −0.06 | −0.07 | −0.01 | 0.01  | 0.01  | 0.02  | 0.01  | 0.00  | 0.00  | 0.00  | 0.00  | 0.00  | 0.00  |
| A8  | 0.00  | 0.00  | 0.00  | 0.02  | 0.02  | 0.00  | −0.01 | 0.00  | 0.00  | 0.00  | 0.00  | 0.00  | 0.00  | 0.00  | 0.00  | 0.00  |
| A9  | 0.00  | 0.00  | 0.00  | 0.00  | −0.01 | 0.00  | 0.00  | 0.00  | 0.00  | 0.00  | 0.00  | 0.00  | 0.00  | 0.00  | 0.00  | 0.00  |
| A10 | 0.00  | 0.00  | 0.00  | 0.00  | 0.00  | 0.00  | 0.00  | 0.00  | 0.00  | 0.00  | 0.00  | 0.00  | 0.00  | 0.00  | 0.00  | 0.00  |
| A11 | 0.00  | 0.00  | 0.00  | 0.00  | 0.00  | 0.00  | 0.00  | 0.00  | 0.00  | 0.00  | 0.00  | 0.00  | 0.00  | 0.00  | 0.00  | 0.00  |

FIG. 3 is a view showing aberration according to a first embodiment of the present invention.

First data of FIG. 3 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 3 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 4 is a view showing a second embodiment of the high-resolution wide-angle lens system according to the present invention.

As shown, a first lens L1, a second lens L2, a third lens L3, a fourth lens L4, a fifth lens L5, a sixth lens L6, a seventh lens L7, and an eighth lens L8 are sequentially arranged from an object on the optical axis.

Table 3 below shows numerical data of the lenses constituting the optical system according to the second embodiment of the present invention.

TABLE 3

| Surface (Surface number) | RDY (Radius of curvature) | THI (Thickness) | Nd (Refractive index) | Vd (Abbe number) |
|---|---|---|---|---|
| Object | Infinity | Infinity | | |
| S1 | 3.414 | 0.602 | 1.5441 | 56.0 |
| Stop (S2) | 3.201 | 0.076 | | |

TABLE 3-continued

| Surface (Surface number) | RDY (Radius of curvature) | THI (Thickness) | Nd (Refractive index) | Vd (Abbe number) |
|---|---|---|---|---|
| S3 | 2.782 | 1.091 | 1.5441 | 56.0 |
| S4 | 27.985 | 0.051 | | |
| S5 | 31.089 | 0.240 | 1.6700 | 19.4 |
| S6 | 7.191 | 0.480 | | |
| S7 | 11.905 | 0.519 | 1.6150 | 25.9 |
| S8 | 19.877 | 0.128 | | |
| S9 | −10.865 | 0.413 | 1.5350 | 56.0 |
| S10 | −19.352 | 0.407 | | |
| S11 | 32.400 | 0.875 | 1.5441 | 56.0 |
| S12 | −11.267 | 0.177 | | |
| S13 | 3.582 | 0.559 | 1.5441 | 56.0 |
| S14 | 6.473 | 0.868 | | |
| S15 | −38.745 | 0.550 | 1.5350 | 56.0 |
| S16 | 2.928 | 0.184 | | |
| S17 | Infinity | 0.110 | 1.5168 | 64.2 |
| S18 | Infinity | 0.870 | | |
| Image | Infinity | 0.000 | | |

As shown in FIG. 4, the first lens L1, the second lens L2, the third lens L3, the fourth lens L4, the fifth lens L5, the sixth lens L6, the seventh lens L7, and the eighth lens L8 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 4 below.

TABLE 4

|     | s1    | s2    | s3    | s4    | s5    | s6    | s7    | s8    | s9    | s10   | s11    | s12   | s13   | s14   | s15   | s16    |
|-----|-------|-------|-------|-------|-------|-------|-------|-------|-------|-------|--------|-------|-------|-------|-------|--------|
| K   | −2.66 | −1.52 | −0.37 | −0.01 | 0.03  | 13.50 | 0.00  | 0.00  | 0.00  | 0.00  | −98.94 | 3.47  | 0.00  | 0.00  | 62.74 | −15.89 |
| A3  | 0.00  | −0.05 | −0.03 | −0.05 | −0.06 | −0.02 | −0.02 | 0.01  | 0.04  | 0.02  | 0.05   | 0.03  | −0.02 | −0.03 | −0.11 | −0.04  |
| A4  | 0.00  | 0.00  | 0.00  | 0.09  | 0.12  | 0.04  | 0.00  | −0.04 | −0.08 | −0.06 | −0.05  | −0.02 | 0.00  | 0.01  | 0.04  | 0.01   |
| A5  | 0.00  | 0.00  | 0.00  | −0.12 | −0.14 | −0.04 | 0.01  | 0.04  | 0.08  | 0.05  | 0.02   | 0.01  | 0.00  | 0.00  | −0.01 | 0.00   |
| A6  | 0.00  | 0.00  | 0.00  | 0.10  | 0.12  | 0.03  | −0.01 | −0.02 | −0.05 | −0.03 | −0.01  | 0.00  | 0.00  | 0.00  | 0.00  | 0.00   |
| A7  | 0.00  | 0.00  | 0.00  | −0.06 | −0.07 | −0.01 | 0.01  | 0.01  | 0.02  | 0.01  | 0.00   | 0.00  | 0.00  | 0.00  | 0.00  | 0.00   |
| A8  | 0.00  | 0.00  | 0.00  | 0.02  | 0.02  | 0.00  | −0.01 | 0.00  | 0.00  | 0.00  | 0.00   | 0.00  | 0.00  | 0.00  | 0.00  | 0.00   |
| A9  | 0.00  | 0.00  | 0.00  | 0.00  | −0.01 | 0.00  | 0.00  | 0.00  | 0.00  | 0.00  | 0.00   | 0.00  | 0.00  | 0.00  | 0.00  | 0.00   |
| A10 | 0.00  | 0.00  | 0.00  | 0.00  | 0.00  | 0.00  | 0.00  | 0.00  | 0.00  | 0.00  | 0.00   | 0.00  | 0.00  | 0.00  | 0.00  | 0.00   |
| A11 | 0.00  | 0.00  | 0.00  | 0.00  | 0.00  | 0.00  | 0.00  | 0.00  | 0.00  | 0.00  | 0.00   | 0.00  | 0.00  | 0.00  | 0.00  | 0.00   |

FIG. 5 is a view showing aberration according to a second embodiment of the present invention.

First data of FIG. 5 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 5 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

As is apparent from the above description, the present invention relates to a lens system including a first lens, a second lens, a third lens, a fourth lens, a fifth lens, a sixth lens, a seventh lens, and an eighth lens arranged from an object along an optical axis, particularly to a small wide-angle lens system configured such that the lens system is small and lightweight by appropriately designing the refractive powers, shapes, etc. of the lenses and such that the lens system has a horizontal field of view greater than 75 degrees by correcting distortion.

In particular, the present invention provides a small wide-angle lens system having a reduced refractive power, whereby the tolerance of the lens system is alleviated even though TTL is short.

In addition, an angle of incidence AOI that an ordinary ray of a field forms with a normal line at a point of the image-side surface of the eighth lens through which the ordinary ray passes is formed so as to be less than 12° such that the shape of the outside corner of the eighth lens is inclined toward the object, which is advantageous to a small lens system.

In addition, the ratio of the distance between the object-side surface of the first lens and an image surface to the height of the image surface is less than 1.5, whereby it is possible to provide a lens system having a short length, which is easily applicable to a thin or small camera module, particularly a smartphone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system comprising a first lens, a second lens, a third lens, a fourth lens, a fifth lens, a sixth lens, a seventh lens, and an eighth lens sequentially arranged from an object, wherein
the first lens is a meniscus lens having a lens surface convex toward the object,
the second lens is a meniscus lens configured such that a lens surface having a positive refractive power is convex toward the object,
the third lens is a meniscus lens configured such that a lens surface having a negative refractive power is convex toward the object,
the fourth lens is a lens having a positive refractive power,
the fifth lens is a lens having a negative refractive power,
the sixth lens is a meniscus lens having a lens surface convex toward an image,
the seventh lens is a meniscus lens having a positive refractive power and configured such that a lens surface of the seventh lens is convex toward the object in a vicinity of an optical axis, and
the eighth lens is a lens having a negative refractive power and configured such that both an object-side surface and an image-side surface of the eighth lens are concave in the vicinity of the optical axis, and wherein
all surfaces of the first to eighth lenses are aspherical surfaces,
each of the seventh lens and the eighth lens has at least one inflection point, and
an absolute value of a refractive power (P1) of the first lens satisfies |P1|<0.01,
wherein the small lens system has at least one of the following features (a), (b), (c) and (d):
(a) a ratio of an effective-diameter outermost distance (et12) between the first lens and the second lens to a center distance (c12) between the first lens and the second lens satisfies 6<et12/ct12<10;
(b) a focal distance (f6) of the sixth lens, a focal distance (f7) of the seventh lens, and a focal distance (F) of the entire small lens system are configured to satisfy 1.0< (F/f6)+(F/f7)<−0.5;
(c) an Abbe number (V5) of the fifth lens, an Abbe number (V6) of the sixth lens, an Abbe number (V7) of the seventh lens, and an Abbe number (V8) of the eighth lens satisfy 40<V5<60, 40<V6<60, 40<V7<60, and 40<V8<60, respectively; and (d) the first lens has at least one inflection point.

2. The small lens system according to claim 1, wherein a ratio of an effective-diameter outermost distance (et12) between the first lens and the second lens to a center distance (c12) between the first lens and the second lens satisfies 6<et12/ct12<10.

3. The small lens system according to claim 1, wherein a ratio of a distance (TTL) between an object-side surface of the first lens and an image surface to an image height (ImagH) of the small lens system satisfies 1.0<TTL/ImagH<1.5.

4. The small lens system according to claim 1, wherein an absolute value of a ratio of a focal distance (f1) of the first lens to a focal distance (F) of the entire lens system satisfies 100<|f1/F|.

5. The small lens system according to claim 1, wherein the small lens system has a field of view greater than 75 degrees.

6. The small lens system according to claim 1, wherein an F number (Fno) of each lens of the small lens system satisfies Fno<2.0.

7. The small lens system according to claim 1, wherein a focal distance (f6) of the sixth lens, a focal distance (f7) of the seventh lens, and a focal distance (F) of the entire small lens system are configured to satisfy 1.0<(F/f6)+(F/f7)<−0.5.

8. The small lens system according to claim 1, wherein a ratio of a radius of curvature (R4) of an object-side surface of the second lens to a center thickness (ct2) of the second lens satisfies 2.0<R4/ct2<3.0.

9. The small lens system according to claim 1, wherein an object-side surface and an image-side surface of the seventh lens are concave in a peripheral portion of the lens.

10. The small lens system according to claim 1, wherein a ratio of a diameter (EPD) of an entrance pupil to a center distance (ct14) from the first lens to the fourth lens satisfies 1.1<EPD/ct14<1.8.

11. The small lens system according to claim 1, wherein an Abbe number (V5) of the fifth lens, an Abbe number (V6) of the sixth lens, an Abbe number (V7) of the seventh lens, and an Abbe number (V8) of the eighth lens satisfy 40<V5<60, 40<V6<60, 40<V7<60, and 40<V8<60, respectively.

12. The small lens system according to claim 1, wherein the first lens has at least one inflection point.

13. A small lens system comprising a first lens, a second lens, a third lens, a fourth lens, a fifth lens, a sixth lens, a seventh lens, and an eighth lens sequentially arranged from an object, wherein the first lens is a meniscus lens having a lens surface convex toward the object, the second lens is a meniscus lens configured such that a lens surface having a positive refractive power is convex toward the object, the third lens is a meniscus lens configured such that a lens surface having a negative refractive power is convex toward the object, the fourth lens is a lens having a positive refractive power, the fifth lens is a lens having a negative refractive power, the sixth lens is a meniscus lens having a lens surface convex toward an image, the seventh lens is a meniscus lens having a positive refractive power and configured such that a lens surface of the seventh lens is convex toward the object in a vicinity of an optical axis, and the eighth lens is a lens having a negative refractive power and configured such that both an object-side surface and an image-side surface of the eighth lens are concave in the vicinity of the optical axis, and wherein all surfaces of the first to eighth lenses are aspherical surfaces, each of the seventh lens and the eighth lens has at least one inflection point, an absolute value of a refractive power (P1) of the first lens satisfies |P1|<0.01, and an angle of incidence (AOI) that an ordinary ray of a field forms with a normal line at a point of the image-side surface of the eighth lens through which the ordinary ray passes satisfies AOI<12°, wherein the small lens system has at least one of the following features (a), (b), (c) and (d):

(a) a ratio of an effective-diameter outermost distance (et12) between the first lens and the second lens to a center distance (c12) between the first lens and the second lens satisfies 6<et12/ct12<10;

(b) a focal distance (f6) of the sixth lens, a focal distance (f7) of the seventh lens, and a focal distance (F) of the entire small lens system are configured to satisfy 1.0<(F/f6)+(F/f7)<−0.5;

(c) an Abbe number (V5) of the fifth lens, an Abbe number (V6) of the sixth lens, an Abbe number (V7) of the seventh lens, and an Abbe number (V8) of the eighth lens satisfy 40<V5<60, 40<V6<60, 40<V7<60, and 40<V8<60, respectively; and (d) the first lens has at least one inflection point.

14. The small lens system according to claim 13, wherein a ratio of an effective-diameter outermost distance (et12) between the first lens and the second lens to a center distance (c12) between the first lens and the second lens satisfies 6<et12/ct12<10.

15. The small lens system according to claim 13, wherein a ratio of a distance (TTL) between an object-side surface of the first lens and an image surface to an image height (ImagH) of the small lens system satisfies 1.0<TTL/ImagH<1.5.

16. The small lens system according to claim 13, wherein an absolute value of a ratio of a focal distance (f1) of the first lens to a focal distance (F) of the entire lens system satisfies 100<|f1/F|.

17. The small lens system according to claim 13, wherein an F number (Fno) of each lens of the small lens system satisfies Fno<2.0.

18. The small lens system according to claim 13, wherein a focal distance (f6) of the sixth lens, a focal distance (f7) of the seventh lens, and a focal distance (F) of the entire small lens system are configured to satisfy 1.0<(F/f6)+(F/f7)<−0.5.

19. The small lens system according to claim 13, wherein a ratio of a radius of curvature (R4) of an object-side surface of the second lens to a center thickness (ct2) of the second lens satisfies 2.0<R4/ct2<3.0.

20. The small lens system according to claim 13, wherein an object-side surface and an image-side surface of the seventh lens are concave in a peripheral portion of the lens.

21. The small lens system according to claim 13, wherein a ratio of a diameter (EPD) of an entrance pupil to a center distance (ct14) from the first lens to the fourth lens satisfies 1.1<EPD/ct14<1.8.

22. The small lens system according to claim 13, wherein an Abbe number (V5) of the fifth lens, an Abbe number (V6) of the sixth lens, an Abbe number (V7) of the seventh lens, and an Abbe number (V8) of the eighth lens satisfy 40<V5<60, 40<V6<60, 40<V7<60, and 40<V8<60, respectively.

23. The small lens system according to claim 13, wherein the first lens has at least one inflection point.

24. The small lens system according to claim 13, wherein
all surfaces of the first to eighth lenses are aspherical surfaces, and
each of the first to eighth lenses is made of plastic.

25. The small lens system according to claim 13, wherein each of the seventh lens and the eighth lens has at least one inflection point.

* * * * *